(12) United States Patent
Minkovich

(10) Patent No.: US 9,808,128 B2
(45) Date of Patent: Nov. 7, 2017

(54) ADJUSTABLE BRACKET ASSEMBLY FOR GLASS PANEL

(71) Applicant: BATH AUTHORITY LLC, Warminster, PA (US)

(72) Inventor: Michael Minkovich, Richboro, PA (US)

(73) Assignee: BATH AUTHORITY LLC, Warminster, PA (US)

( * ) Notice: Subject to any disclaimer, the term of this patent is extended or adjusted under 35 U.S.C. 154(b) by 107 days.

(21) Appl. No.: 15/052,947

(22) Filed: Feb. 25, 2016

(65) Prior Publication Data

US 2017/0245696 A1   Aug. 31, 2017

(51) Int. Cl.
*E03D 1/00* (2006.01)
*A47K 3/30* (2006.01)
(Continued)

(52) U.S. Cl.
CPC .............. *A47K 3/30* (2013.01); *F16B 5/0685* (2013.01); *F16M 13/02* (2013.01); *A47K 2003/307* (2013.01)

(58) Field of Classification Search
CPC .... E04B 2/7425; E04B 2/7427; E04B 2/7401; A47K 3/36; A47K 3/362
USPC ............. 248/544, 689, 213.1, 220.1, 220.21, 248/220.22, 222.13, 298.1, 316.1, 316.2, 248/200, 475.1, 226.11, 227.2; 4/612, 4/614
See application file for complete search history.

(56) References Cited

U.S. PATENT DOCUMENTS 2,237,282 A * 4/1941 Reed ..................... B60R 1/06
                                                        16/223
2,895,698 A * 7/1959 Palmer .................. A47G 25/08
                                                        16/223
(Continued)

OTHER PUBLICATIONS

DreamLine AuquaLux, posted at amazing-bath.com (site visited Jan. 30, 2017), available at http://discobath.com/dreamline-shdr-3348588-rt-aqualux-56-to-60-w-x-30-d-x-58-h-hinged-tub-door.html (2 pages).
(Continued)

*Primary Examiner* — Terrell McKinnon
*Assistant Examiner* — Michael McDuffie
(74) *Attorney, Agent, or Firm* — Fox Rothschild LLP

(57) ABSTRACT

An adjustable bracket assembly for securing an edge of a panel relative to a surface. The adjustable bracket assembly includes a mounting member and a bracket member. The mounting member has a body configured for mounting on the surface and defining at least two fastening screw receiving holes. The bracket member includes an extension arm extending perpendicularly to a mounting arm. The extension arm includes a panel clamp and the mounting arm includes a mounting plate extending therefrom. The mounting plate defines at least two fastening screw holes and at least two adjustment screw holes therethrough. A fastening screw extends through each fastening screw hole and is received in a respective fastening screw receiving hole. An adjustment screw is positioned in each adjustment screw hole and is threadably adjustable to contact the mounting member body and adjust the angular relationship between the bracket member and the mounting member.

14 Claims, 7 Drawing Sheets

(51) Int. Cl.
  *F16M 13/02* (2006.01)
  *F16B 5/06* (2006.01)

(56) References Cited

U.S. PATENT DOCUMENTS

| | | | | |
|---|---|---|---|---|
| 3,049,327 A * | 8/1962 | Caudell | ......... | A47H 1/122 248/220.1 |
| 3,511,106 A * | 5/1970 | Deeby | ......... | H01O 3/005 248/220.1 |
| 3,692,266 A * | 9/1972 | Jacobs | ......... | A47H 1/10 248/301 |
| 3,966,056 A * | 6/1976 | Larson | ......... | A47F 5/0018 108/152 |
| 4,785,498 A * | 11/1988 | Brotschi | ......... | E05D 7/0018 16/238 |
| 4,949,929 A * | 8/1990 | Kesselman | ......... | A47B 96/06 248/220.1 |
| 5,364,055 A * | 11/1994 | Abinanti | ......... | A47F 3/12 211/87.01 |
| 5,664,749 A * | 9/1997 | Kump | ......... | G09F 15/0012 248/205.3 |
| 5,867,869 A * | 2/1999 | Garrett | ......... | A47K 3/36 16/252 |
| D439,558 S | 3/2001 | Potter | | |
| 6,418,590 B1 * | 7/2002 | Nipper | ......... | E05D 15/264 16/229 |
| 6,640,931 B2 | 11/2003 | Palmer et al. | | |
| D563,771 S | 3/2008 | Prechtel et al. | | |
| 7,490,424 B2 * | 2/2009 | Caterinacci | ......... | G09F 7/20 40/606.14 |
| D588,441 S | 3/2009 | Clarke | | |
| D592,669 S | 5/2009 | Malisse et al. | | |
| D594,312 S | 6/2009 | Clarke | | |
| D594,313 S | 6/2009 | Clarke | | |
| 7,784,755 B1 * | 8/2010 | Johnson | ......... | E04B 9/006 248/220.21 |
| D649,026 S | 11/2011 | Kong et al. | | |
| 8,220,888 B2 * | 7/2012 | Tamayama | ......... | E05D 7/02 16/230 |
| 8,720,839 B2 * | 5/2014 | Lijesnic | ......... | A47B 47/0033 248/300 |
| 8,806,815 B1 * | 8/2014 | Liu | ......... | H01L 31/0422 248/295.11 |
| D769,698 S | 10/2016 | Oltrogge | | |
| 2010/0127140 A1 * | 5/2010 | Smith | ......... | G06F 3/0418 248/220.1 |
| 2010/0127141 A1 * | 5/2010 | Chan | ......... | H05K 7/1492 248/220.22 |
| 2010/0252701 A1 * | 10/2010 | Vogel | ......... | H04Q 1/068 248/213.1 |
| 2015/0113724 A1 * | 4/2015 | Corpuz, Jr. | ......... | A47K 3/36 4/607 |
| 2016/0290552 A1 | 10/2016 | Holestine | | |

OTHER PUBLICATIONS

DreamLine Linea, posted at amazon.com (site visted Jan. 30, 2017). Available at https://www.amazon.com/DreamLine-Frameless-Shower-Brushed-Nickel/dp/B013OZG664/ref=sr_1_1?ie=UTF8&qid=1486749396&sr=8-1&keywords=dreamline+linea+shower+door+nickel (7 pages).

DreamLine on Faucet, posted at faucet.com (site visited Jan. 30, 2017) available at https://www.faucet.com/dreamline-shdr-19605810-brushed-nickel-mirage-58-high-x-60-wide-sliding-frameless-shower-door-with-clear-glass/f1902652 (2 pages).

Mirage-X, posted at dreamline.com (site visited Jan. 30, 2017) available at http://dreamline.com/bathtub-doors/dreamline-mirage-x-56-60-in-w-x-58-in-h-sliding-tub-door__shdr-19605801-01.html (3 pages).

Information about Related Patents and Patent Applications, see section 6 of the accompanying Information Disclosure Statement Letter, which concerns Related Patents and Patent Applications.

* cited by examiner

ADJUSTABLE BRACKET ASSEMBLY FOR GLASS PANEL

FIELD OF THE INVENTION

This invention relates to an adjustable bracket assembly. More particularly, the invention relates to an adjustable bracket for supporting a glass panel, for example, a glass panel of a shower enclosure.

BACKGROUND OF THE INVENTION

For many years, the most commonly used enclosure for a tub/shower bathing facility has included a pair of sliding glass doors framed in metal. In a typical installation, an outer metal frame circumscribes the entry to the bath and is attached at the sides to the walls of the facility. The installation also includes a header spanning the entrance and a guide rail attached to the tub or shower base. The shower doors are hung at the top from the header and guided at the bottom by the rail so that they can slide back and forth in the entryway to allow entry and egress and to create a splash barrier.

There are several disadvantages with the described installation, both functional and aesthetic. First, the support structure is always present in the entryway to the bathing area, thus always at least partially blocking the entrance and restricting free access to the bathing area, a special problem when bathing a small child or when cleaning the facility. The header also adds an undesired obstruction in the entryway which must be avoided when entering or leaving the area. Moreover, the metal of the frame and all the glass-to-metal interfaces require special cleaning and maintenance. Apart from these functional constraints, the metal required for the framing, header and rail detracts from a clean and open appearance of the facility.

Various systems eliminating the shower door header have been utilized, including enclosure systems with the shower door hingedly or slidably connected to a glass panel which is in turn mounted to an adjacent wall. A problem commonly arises in that the surrounding walls to which the glass panel is to be secured are out-of-square with respect to the shower enclosure. There has previously been a support arm, attached at one end to the stationary glass panel and at the other end to the wall, which provides stability to the stationary glass panel. This support arm forms the hypotenuse of a triangle described by the support arm, the wall, and the stationary glass panel. This arm is attached to the top edge of the stationary glass panel and at an equal height to the wall. In the case of the support arm there is a restriction of free motion within the shower or bath, as the arm is an obstruction at or below head-height for many people. These previous systems, including the support arm, allow an undesirable amount of deflection of the stationary glass panel. In at least one embodiment, the support arm is composed of three pieces which are connected to each other by bolts. The support arm described can experience a pivoting action about the bolts within its structure. This pivoting can contribute to the deflection of the stationary glass panel.

Thus, it can be seen that there is a need for a bracket which can be utilized to secure a glass panel to a wall or the like and facilitate adjustment to accommodate an out-of-square configuration.

SUMMARY OF THE INVENTION

In at least one embodiment, the present invention provides an adjustable bracket assembly for securing an edge of a panel relative to a surface. The adjustable bracket assembly includes a mounting member and a bracket member. The mounting member has a body configured for mounting on the surface and defining at least two fastening screw receiving holes. The bracket member includes an extension arm extending perpendicularly to a mounting arm. The extension arm includes a panel clamp and the mounting arm includes a mounting plate extending therefrom. The mounting plate defines at least two fastening screw holes and at least two adjustment screw holes therethrough. A fastening screw extends through each fastening screw hole and is received in a respective fastening screw receiving hole. An adjustment screw is positioned in each adjustment screw hole and is threadably adjustable to contact the mounting member body and adjust the angular relationship between the bracket member and the mounting member.

In at least one embodiment, the bracket assembly further includes a cover member configured to be positioned over and conceal the mounting member and the mounting plate.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
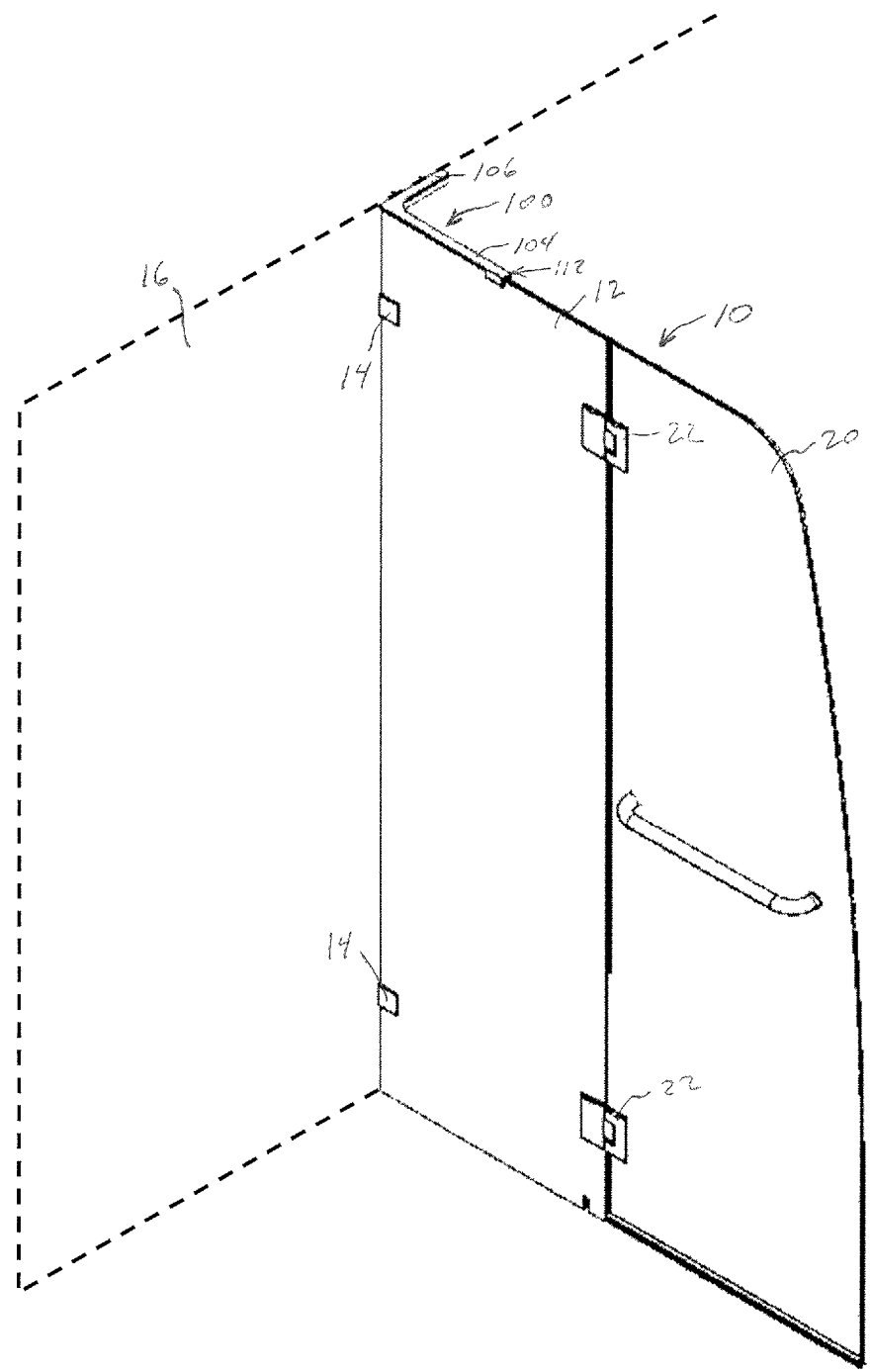
FIG. 1 is a perspective view of an exemplary shower enclosure incorporating a bracket assembly in accordance with an embodiment of the invention.
Figure 2:
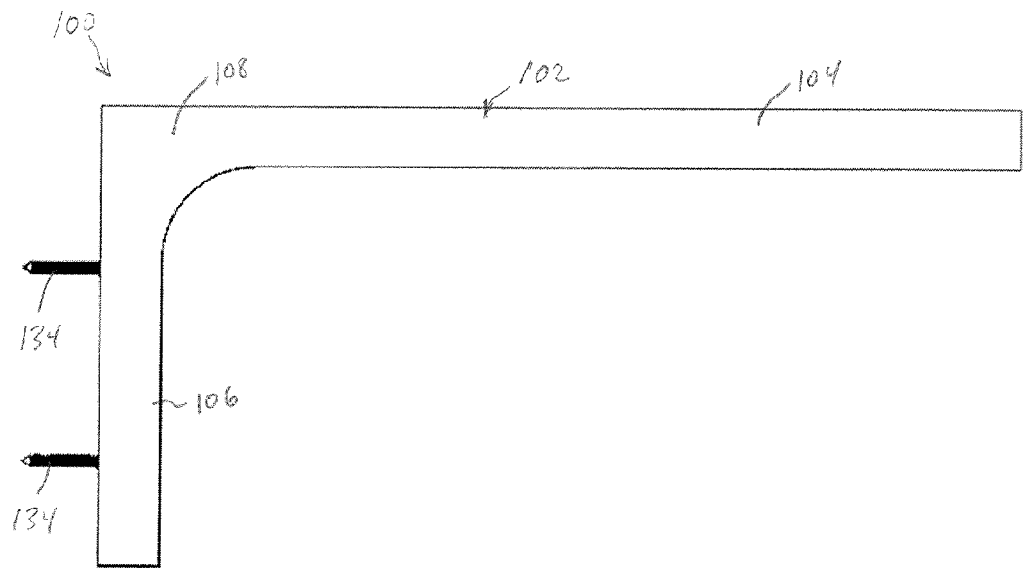
FIG. 2 is a top plan view of the bracket assembly of FIG. 1.
Figure 3:
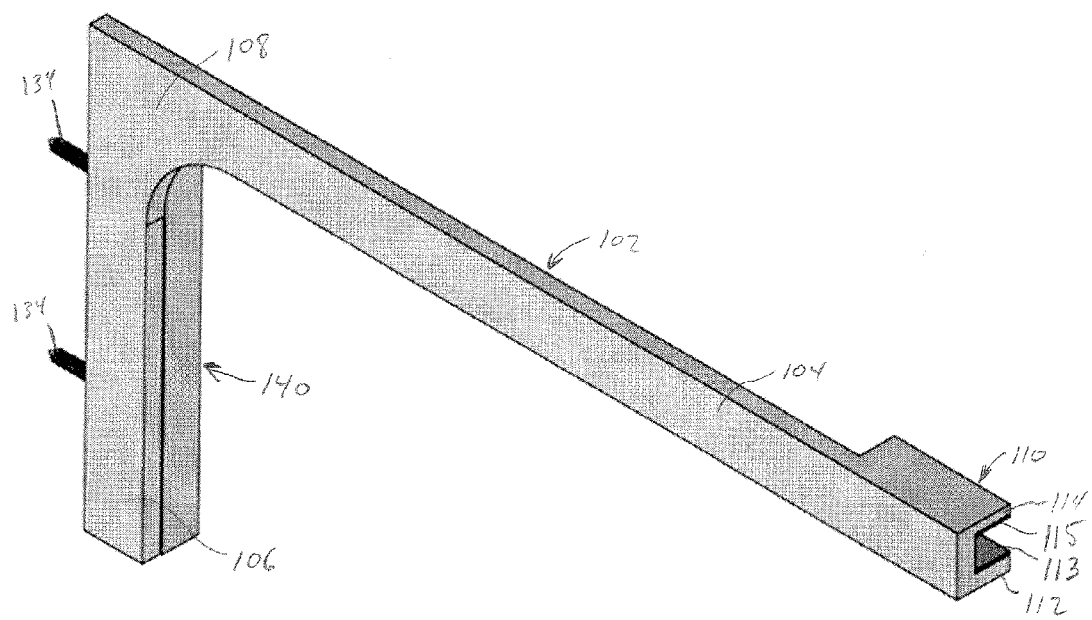
FIG. 3 is a top perspective view of the bracket assembly of FIG. 2.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Referring to FIG. 1, an exemplary shower enclosure 10 incorporating an adjustable bracket assembly 100 in accordance with an embodiment of the invention will be described. The shower enclosure 10 includes a glass panel 12 secured to a wall 16 via an adjustable bracket assembly 100 and two side brackets 14. A shower door 20 is hingedly connected to the glass panel 12 by a pair of hinges 22. The adjustable bracket assembly 100 extends along a top edge of the glass panel 12 and attaches thereto a distance from the wall 16. Such a configuration maintains a clean aesthetic appearance for the glass panel 12 while minimizing twisting of the glass panel 12, compared to if just side brackets 14 were utilized.

Figure 9:
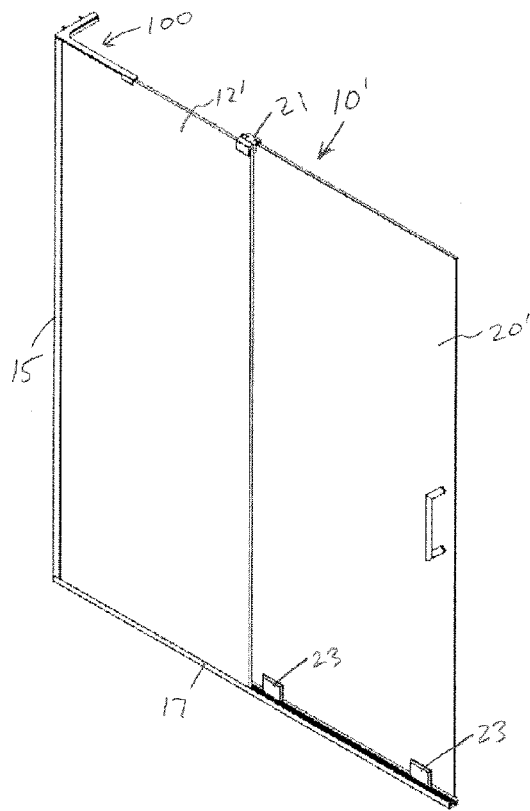
FIGS. 9-11 are perspective views illustrating other exemplary shower enclosures incorporating a bracket assembly in accordance with an embodiment of the invention.
Figure 10:
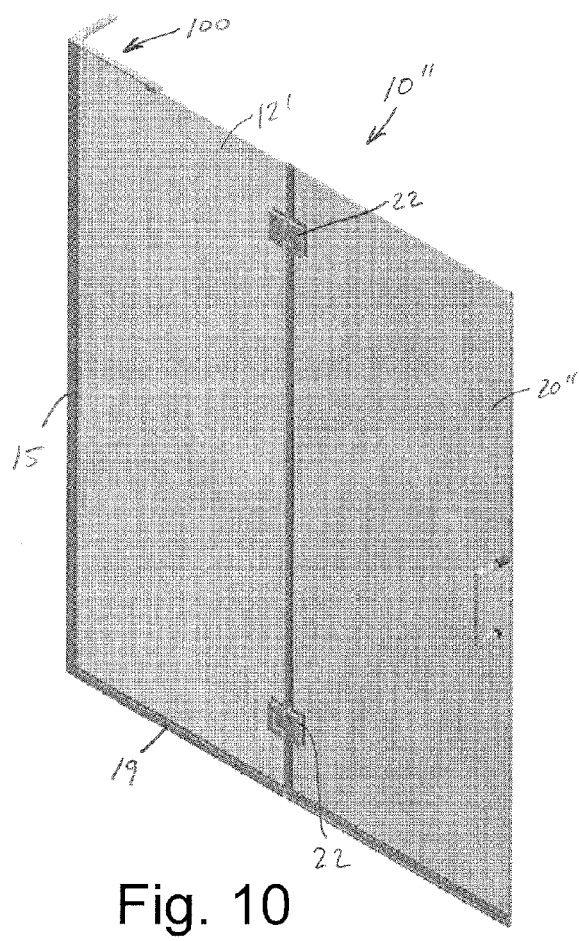
Figure 11:
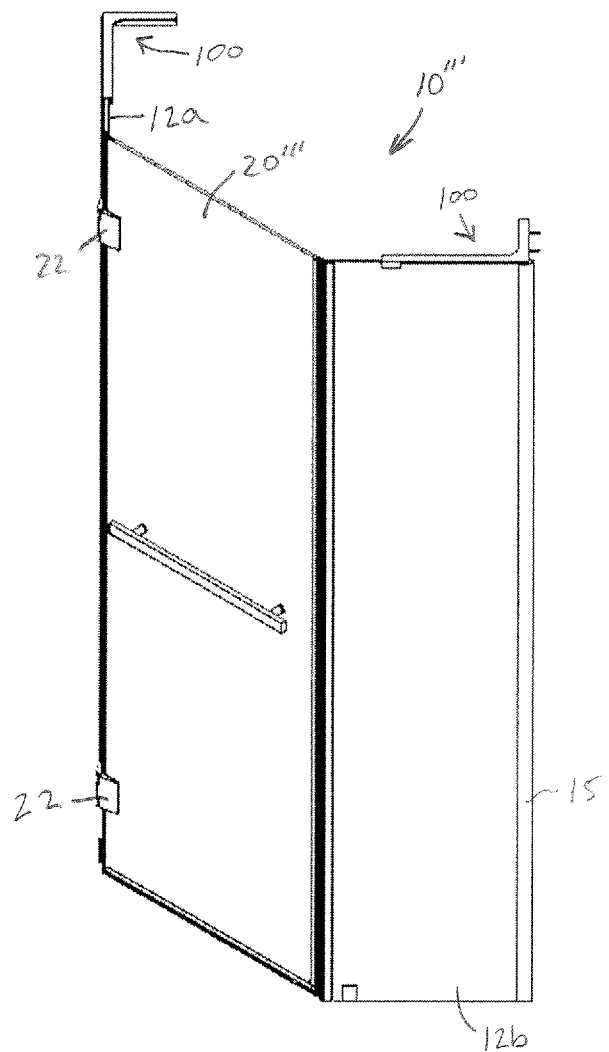

The adjustable bracket assembly 100 is not limited to the shower enclosure 10 illustrated in FIG. 1. FIGS. 9-11 illustrate additional exemplary shower enclosures incorporating one or more adjustable bracket assemblies 100. The shower enclosure 10' illustrated in FIG. 9 includes a glass panel 12' supported by a wall frame 15, a bottom frame 17 and an adjustable bracket assembly 100. The door 20' is slidable relative to the glass panel 12' via an upper glide member 21 secured to the glass panel 12' and lower glide members 23 which move along a track defined by the bottom frame 17. The shower enclosure 10" illustrated in FIG. 10 includes a glass panel 12' supported by a wall frame 15, a bottom frame 19 and an adjustable bracket assembly 100. The door 20" is hingedly connected to the glass panel 12' by a pair of hinges 22. The shower enclosure 10'" illustrated in FIG. 11 includes two opposed glass panels 12a, 12b, each of which is supported by a wall frame 15 and an adjustable bracket assembly 100. The door 20'" is hingedly connected to the glass panel 12a by a pair of hinges 22. In each case, the adjustable bracket assembly 100 facilitates adjustment of the glass panel relative to an out-of-square wall. It is understood that the illustrated shower enclosures are for illustration only and the adjustable bracket assembly 100 may be utilized to support a glass panel in various shower enclosure configurations.

Referring to FIGS. 2-8, the adjustable bracket assembly 100 will be described in more detail. With specific reference to FIG. 5, the adjustable bracket assembly 100 generally includes an L-shaped bracket member 102, a mounting member 130 and a cover member 140. Generally, the mounting member 130 is configured to be mounted to a wall or the like. A mounting arm 106 of the bracket member 102 is configured to be secured to the mounting member 130 and adjusted relative thereto via adjustment screws 126 such that the extension arm 104 of the bracket member 102 extends perpendicular to the wall. The free end of the extension arm 104 includes a clamp 110 for securing to a top edge of a glass panel such that the glass panel is maintained relative to the wall. The cover member 140 slidably engages the mounting member 130 and covers the mounting member 130 and a portion of the bracket member 102 to provide a clean, finished look. Having described the general configuration of the bracket assembly 100, the components will be described in more detail.

Referring to FIGS. 2-6, the bracket member 102 includes the extension arm 104 and the mounting arm 106 which are joined at a junction 108 such that the extension arm 104 is perpendicular to the mounting arm 106. The bracket member 102 has a low profile, i.e. the height of the arms 104, 106 is less than the width thereof. The clamp 110 is defined on the free end of the extension arm 104 and includes a pair of flanges 112, 114 extending perpendicularly from the extension arm 104 in spaced apart relation to define a panel receiving channel 111. Friction pads 113, 115 are positioned in the receiving channel 111, each adjacent a respective flange 112, 114. Through holes 117 in flange 112 are each configured to receive a respective set screw 116. Once the glass panel is positioned in the receiving channel 111, the set screws 116 are tightened to bring the friction pads 113, 115 into securing contact on the glass panel. The friction pads 113, 115 may be manufactured from various materials as is known in the art. The invention is not limited to the illustrated clamp and other clamp configurations may be utilized.

Figure 6:
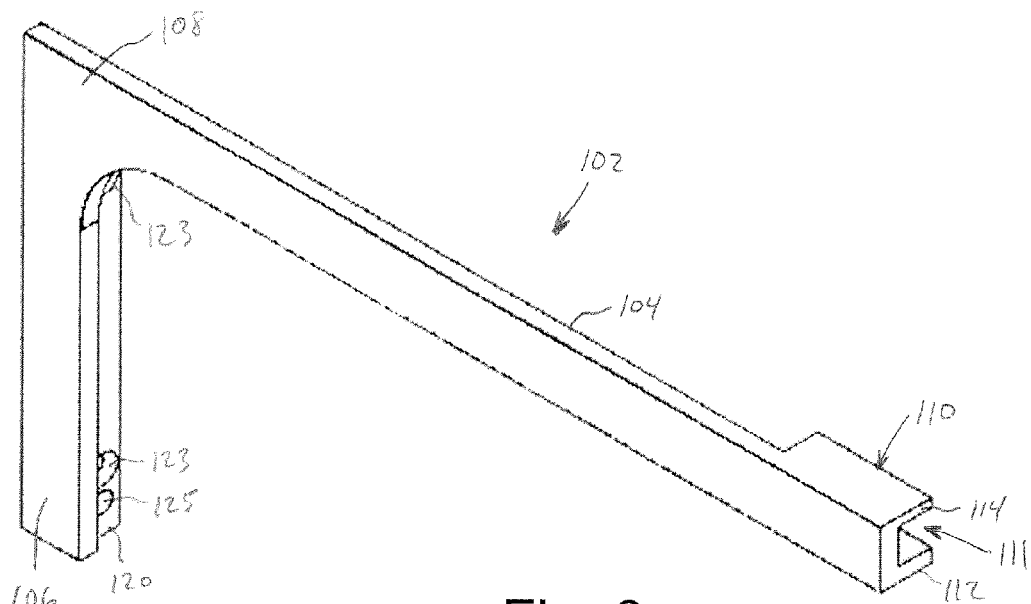
FIG. 6 is a perspective view of the bracket member of the bracket assembly of FIG. 2.
Figure 5:
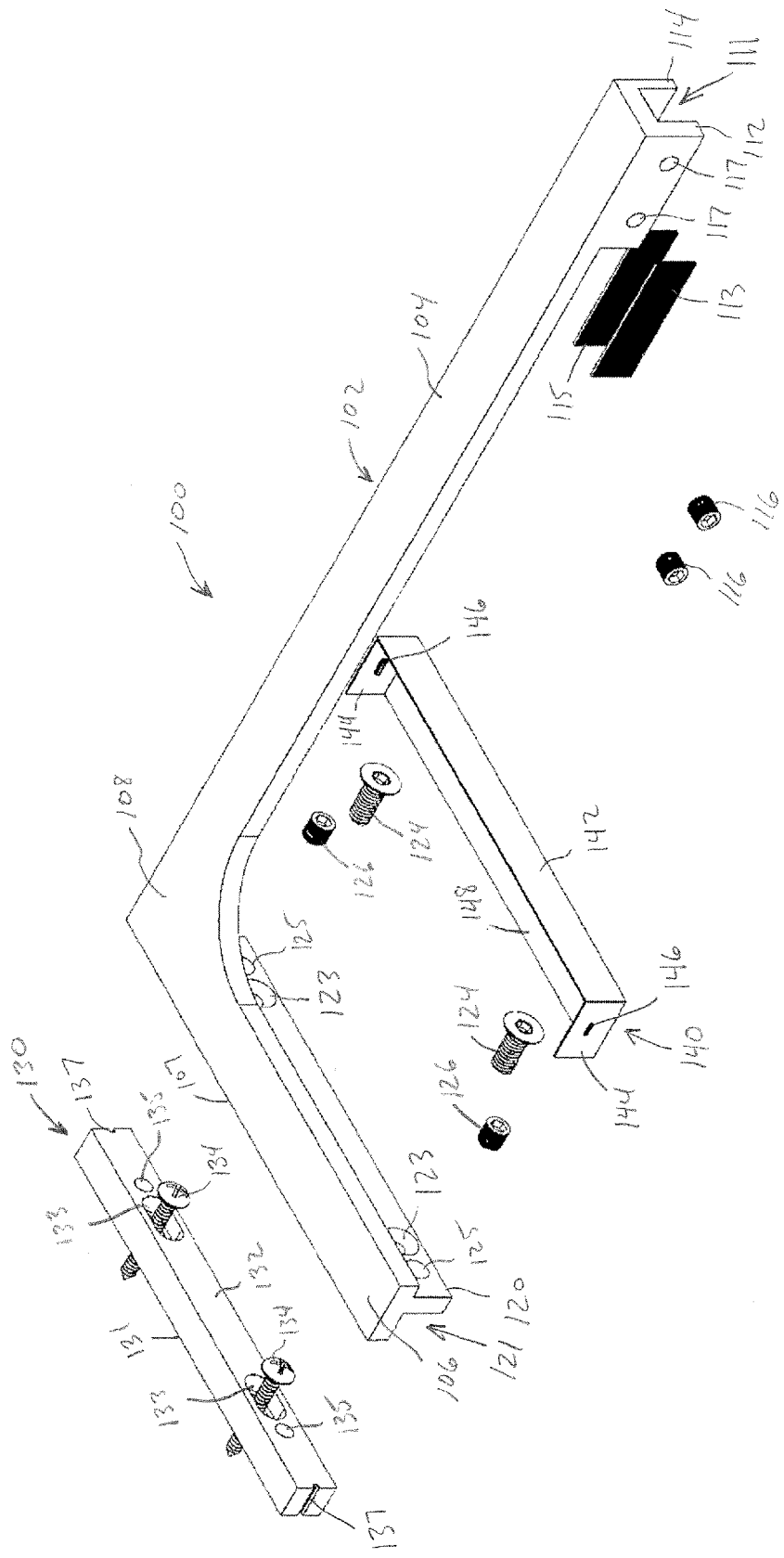
FIG. 5 is an exploded perspective view of the bracket assembly of FIG. 2.
Figure 7:
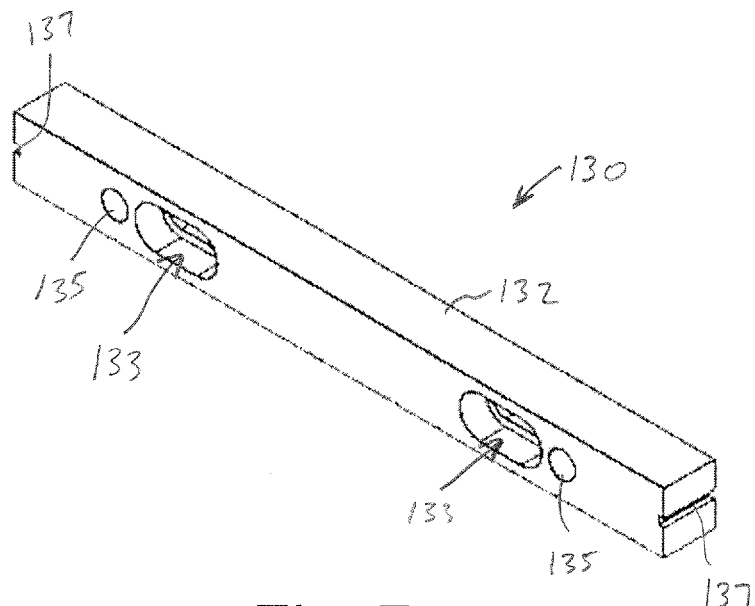
FIG. 7 is a perspective view of the mounting member of the bracket assembly of FIG. 2.

Referring to FIGS. 5-7, to facilitate mounting of the bracket member 102 to the mounting member 130, a mounting plate 120 extends from a lower surface of the mounting arm 106 such that a mounting member receiving area 121 is defined by the plate 120 and a portion of the mounting arm 106 (see FIG. 5). The mounting member receiving area 121 preferably has a height and width substantially equal to a height and width of the body 132 of the mounting member 130. With such a configuration, upon securing of the mounting plate 120 to the mounting member 130, as described below, the mounting arm 106 sits upon the mounting member 130 and an edge 107 of the mounting arm 106 is substantially aligned with a wall contacting surface 131 of the mounting member body 132.

In the illustrated embodiment, the mounting member body 132 includes two or more mounting through bores 133 through which mounting screws 134 are passed and secured to mount the mounting member 130 to a wall or other surface. In the illustrated embodiment, the mounting through bores 133 have an elongated or slotted configuration to facilitate lateral adjustment of the position of the mounting member 130. While through bores and mounting screws are illustrated, the invention is not limited to such and the mounting member 130 may be otherwise mounted on a wall or surface, for example, via an adhesive, mortar or other mounting means.

The mounting plate 120 defines a pair of fastening screw holes 123 extending therethrough and a pair of adjustment screw holes 125 extending therethrough. Each fastening screw hole 123 is configured to align with a respective screw receiving hole 135 on the mounting member 130 such that the bracket member 102 may be secured to the mounting member 130 by passing fastening screws 124 through the fastening screw holes 123 and securing them in the respective screw receiving holes 135. Adjustment screws 126, which are preferably set screws, are positioned in the adjustment screw holes 125. If the extension arm 104 is not extending properly along the shower enclosure, one of the adjustment screws 126 may be tightened such that it contacts the surface of the mounting member body 132 such that the angular relationship of the extension arm 104 relative to the wall and the enclosure may be adjusted. The fastening screws 124 may be loosened, or not initially fully tightened, to facilitate angular adjustment via the adjustment screws 126. Once the adjustment of the bracket member 102 relative to the mounting member 130 has been completed, the fastening screws 124 may be fully tightened.

Figure 4:
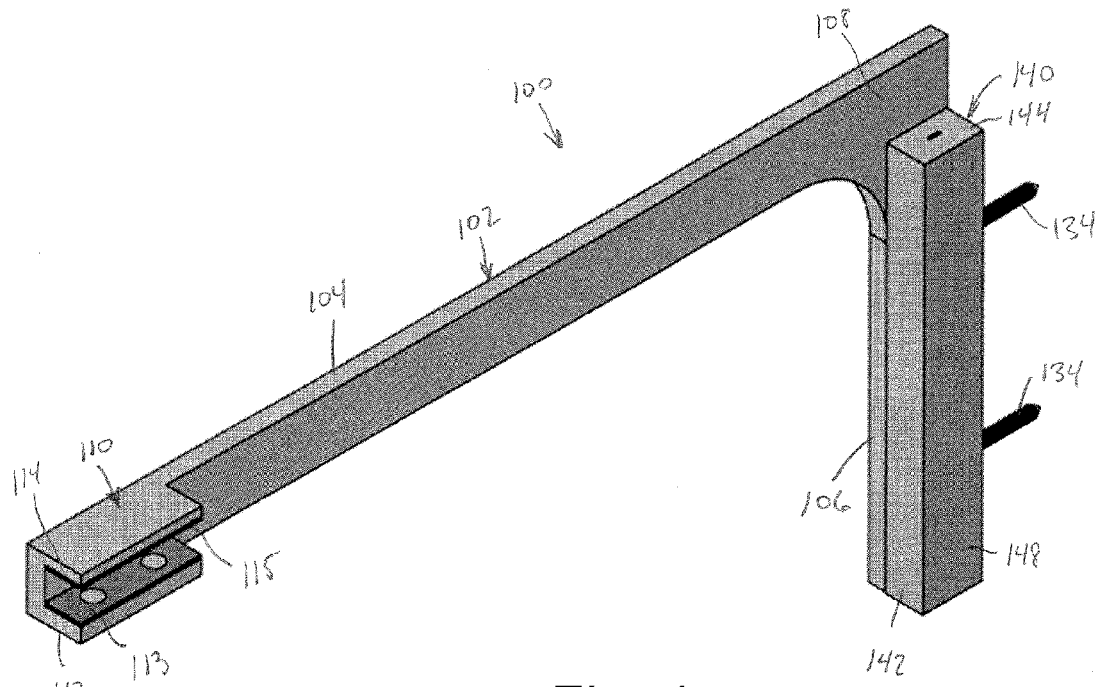
FIG. 4 is a bottom perspective view of the bracket assembly of FIG. 2.
Figure 8:
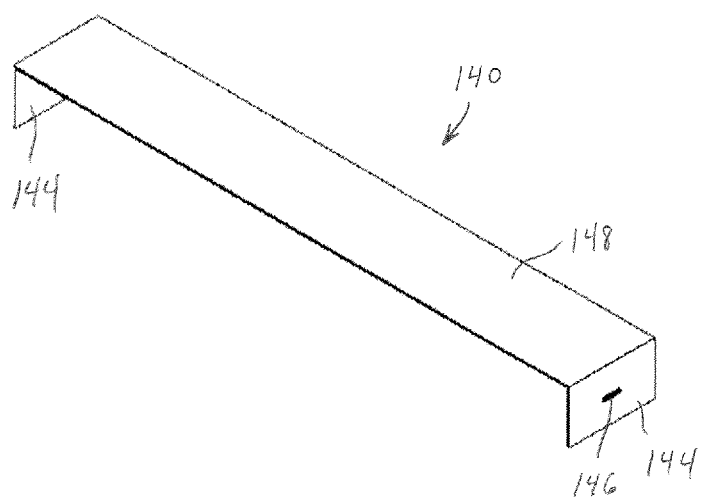
FIG. 8 is a perspective view of the cover member of the bracket assembly of FIG. 2.

Referring to FIGS. 4, 5 and 8, the cover member 140 includes a back surface 142 and a bottom surface 148, both extending between opposed end surfaces 144. Each end surface 144 has an inward projection 146 configured to engage in a respective end slot 137 on the mounting member body 132. After the bracket member 102 has been secured to the mounting member 130, the cover member 140 is positioned over the mounting member 130 and mounting plate 120 such that the projections 146 are received and retained in the end slots 137. The back surface 142, bottom surface 148 and two end surfaces 144 enclose the mounting member 130 and mounting plate 120 such that they are not visible (see FIG. 4) to provide a clean appearance.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. An adjustable bracket assembly for securing an edge of a panel relative to a surface, the adjustable bracket assembly comprising: a mounting member having a body configured for mounting on the surface, the mounting member body defining at least two fastening screw receiving holes; a bracket member having an extension arm extending perpendicularly to a mounting arm, the extension arm including a panel clamp and the mounting arm including a mounting plate extending therefrom, the mounting plate defining at least two fastening screw holes and at least two adjustment screw holes therethrough, each fastening screw hole aligning with a respective fastening screw receiving hole and each adjustment screw hole aligning with a surface of the mounting member body; a fastening screw extending through each fastening screw hole and received in a respective fastening screw receiving hole to secure the bracket member to the mounting member; and an adjustment screw positioned in each adjustment screw hole, each adjustment screw threadably adjustable to contact the mounting member body and adjust the angular relationship between the bracket member and the mounting member through tightening and loosening of the adjustment screws.

2. The adjustable bracket assembly according to claim 1 wherein the mounting member body defines at least two mounting screw bores therethrough and mounting screws are secured through the mounting screw bores to mount the mounting member on the surface.

3. The adjustable bracket assembly according to claim 2 wherein each mounting screw bore has an elongated configuration.

4. The adjustable bracket assembly according to claim 1 wherein the mounting plate and a portion of the mounting arm define a mounting member receiving area which receives the mounting member when the bracket member is secured to the mounting member.

5. The adjustable bracket assembly according to claim 4 wherein the mounting receiving area has a height and width substantially equal to a height and width of the mounting member body.

6. The adjustable bracket assembly according to claim 1 wherein each adjustment screw is a set screw.

7. The adjustable bracket assembly according to claim 1 wherein the panel clamp includes a pair of flanges extending from the extension arm with a panel receiving channel therebetween.

8. The adjustable bracket assembly according to claim 7 wherein the panel clamp further includes a pair of friction pads positioned in the panel receiving channel with each friction pad positioned adjacent a respective flange.

9. The adjustable bracket assembly according to claim 8 wherein at least one set screw extends through one of the flanges and is adjustable to move the friction pads toward one another.

10. The adjustable bracket assembly according to claim 1 further comprising a cover member configured to be positioned over and conceal the mounting member and the mounting plate.

11. The adjustable bracket assembly according to claim 10 wherein the cover member includes a back surface and a bottom surface, both of which extend between opposed end plates.

12. The adjustable bracket assembly according to claim 11 wherein each end plate defines an inward projection configured to be received and retained in a respective end slot extending along the mounting member body.

13. The adjustable bracket assembly according to claim 1 wherein the extension arm and the mounting arm have a height less than a width thereof.

14. A shower enclosure comprising: at least one adjustable bracket assembly according to claim 1 with the mounting member secured to a wall which defines the surface; and a glass panel positioned along the surface with a top edge of the panel positioned in and secured by the panel clamp.

* * * * *